Jan. 25, 1955   H. D. EPSTEIN   2,700,714
THERMOSTATIC SWITCH
Filed Oct. 12, 1953
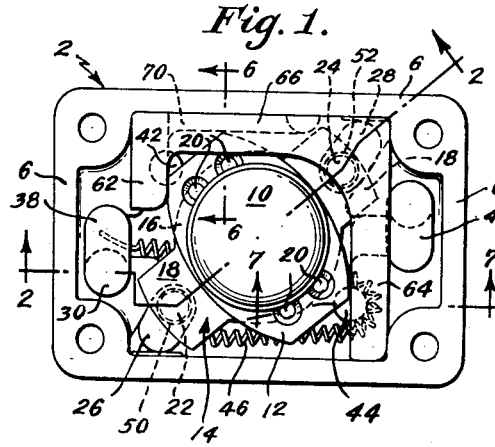
*Fig. 1.*
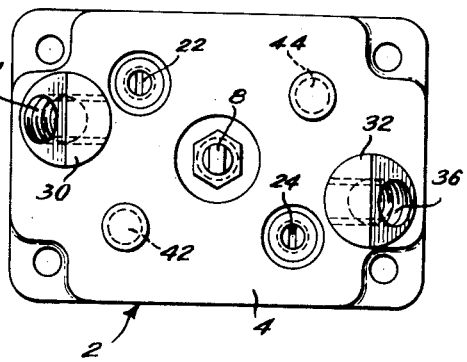
*Fig. 4.*
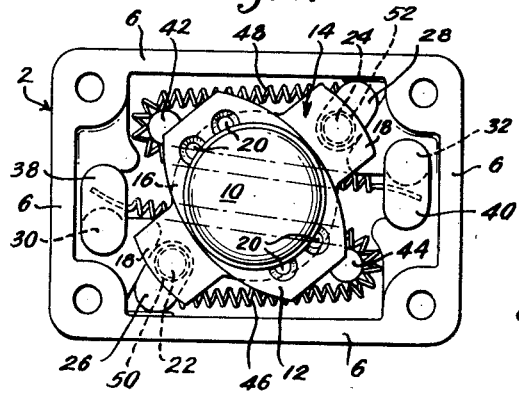
*Fig. 3.*
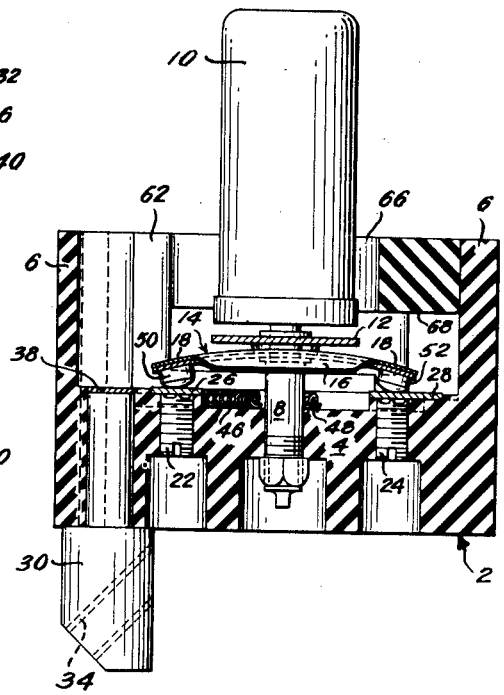
*Fig. 2.*
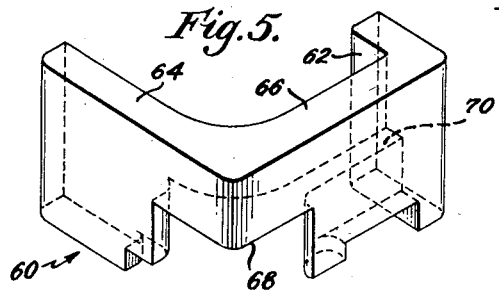
*Fig. 5.*
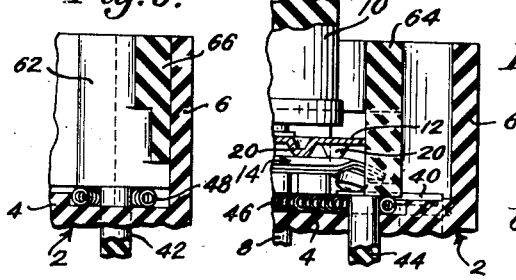
*Fig. 6.*   *Fig. 7.*
Inventor,
Henry David Epstein,
by Townsend M. Genus.
Atty.

_United States Patent Office_

2,700,714
Patented Jan. 25, 1955

2,700,714

THERMOSTATIC SWITCH

Henry David Epstein, Boston, Mass., assignor to Metals & Controls Corporation, Attleboro, Mass., a corporation of Massachusetts Application October 12, 1953, Serial No. 385,564

8 Claims. (Cl. 200—122)

This invention relates to thermostatic switches, and in particular to thermostatic switches using a snap-acting thermostatic element as the actuating means therein.

Among the several objects of the invention may be noted: The provision of a simple thermostatic switch having improved means to orient the respective parts therein; the provision of a switch of the class described in which a separately insertable means is provided to hold the working parts of the device in their predetermined correct relationship; the provision of a switch of the class described in which a molded synthetic resin insert is used to align the snap-acting element and a reset plate for said element, as well as restraining a heating element in its proper position; the provision of a thermostatic switch in which there is provided ample space for the placing and adjusting of working parts, with a separately insertable piece later being provided for guiding and alignment purposes; the provision of a thermostatic switch in which a heater and terminal relationship is such as to minimize loss of heat from the thermal element; and the provision of a snap-acting thermostatic element of the last-named class which is simple and economical to make.

Other objects and advantages of the invention will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 1 is a plan view of one embodiment of this invention;

Fig. 2 is a sectional elevation of Fig. 1, taken in the direction of sight lines 2—2;

Fig. 3 is a plan view of the Fig. 1 embodiment with a separately insertable molded insert removed, in order to show more clearly certain relationships of the working parts;

Fig. 4 is a bottom view of the Fig. 1 embodiment;

Fig. 5 is a perspective view of the separate insert of this invention;

Fig. 6 is a sectional elevation of a portion of the Fig. 1 embodiment, taken in the direction of sight lines 6—6 thereon; and Fig. 7 is a sectional elevation of a portion of the Fig. 1 embodiment, taken in the direction of sight lines 7—7 thereon.

Similar reference characters indicate corresponding parts throughout the several views of the drawings.

In the construction of thermostatic switches using snap-acting elements, it has been the practice to provide in the casing of the switch either grooves or outstanding ribs for the purpose of guiding the moving elements of the switch. In switches of this kind, where heating elements have been used, and particularly where such heating elements are of the coiled type, it has sometimes been the practice to tie down these heaters to the base in order to prevent distortion of the heaters and resulting short circuiting to adjacent metallic parts. However, in switches of this kind where the outside dimensions are relatively small, the provision of bosses, etc. to guide the parts leave undesirably little working space in the interior for the placing and adjustment of certain working parts. Therefore, it is the general purpose of this invention to provide a construction in which a single insertable member serves to align the working parts as well as to restrain the heater, this member being designed to be insertable after all other other manufacturing operations inside the switch are finished. Thus prior to the insertion ample space is provided for such operations.

Referring now to the drawings, there is shown in Fig. 1 a thermostatic switch having a base 2 comprising the bottom 4 and the upstanding skirt 6. Mounted in base 2 is the adjusting screw 8 in the manner shown in the John D. Bolesky United States Patent No. 2,199,388. Mounted on adjusting screw 8 is the reset knob 10, which is mounted as shown in said patent. Also mounted on adjusting post 8 is the reset plate 12 which is shown and described in the copending application of Vincent E. O'Neill, Serial No. 373,302. Also mounted on the adjusting screw 8 is the snap-acting plate 14 similar to the kind shown in the V. G. Vaughan et al., United States Patent No. 2,317,831, having the central snap-acting portion 16 and the tabs or ears 18. The relationship of these parts, and their manner of adjustment and mounting on the adjusting post, are all as described in said United States patents, and therefore need not be detailed here except to say that the snap-acting plate 14 is mounted snugly but not tightly on the adjusting post, and is of the kind that requires manual resetting after it has snapped by being heated. In order to reset it, the push knob 10 is moved toward the disc and this moves the reset plate 12 toward the disc so that the bosses 20 on the reset plate can press against the plate in order to cause it to snap to the position shown.

Also mounted in the bottom 4 are the metal studs 22 and 24. These studs may be molded into the base during the molding operation, or may be inserted therein in suitably provided holes after the base has been formed. Attached to the inner ends of studs 22 and 24 are the contact plates 26 and 28, the attachment being made preferably by welding. Likewise mounted in the base 2 are the terminal posts 30 and 32, these being molded into the base during the molding operation of the latter. Terminals 30 and 32 are provided with tapped holes 34 and 36 for terminal screws in the customary manner. At the inner ends of terminals 30 and 32 are welded or otherwise attached the plates 38 and 40, respectively, these plates serving as attachments for a set of heating elements as will be described later. Also provided in the bottom 4 are the plugs 42 and 44, these plugs being preferably made of porcelain or heat resisting and electrical insulating material. These plugs are inserted in properly provided holes in the bottom 4. However, if desired, and if the temperatures of the aforementioned heating elements are kept low enough, instead of separately insertable plugs, suitable bosses may be molded as an integral part of the base 2, these bosses to project above the bottom 4 a sufficient distance to hold the heaters, as will be described below.

Extending from terminal 26 and around plug 44 over to the plate 38 is the coiled heating element 46. The attachment of the ends of heating element 46 to the plates 26 and 38 is preferably made by welding, but a brazing operation can be used if desired. The diameter of the heater 46 is such that when it is wrapped around the stud 44, the stud height is just slightly greater than the heater diameter. This is shown in Fig. 6. In like manner, the heating element 48 extends from terminal plate 28 around stud 42 to plate 40. Again, the ends of the heating element are fastened by welding to the respective plates, and the height of stud 42 is just slightly greater than the diameter of heating element 48.

Carried by the ears 18 on the snap-acting element 14 are the contacts 50 and 52, contact 50 engaging terminal plate 26, and contact 52 engaging terminal plate 28.

At this point, one of the features of the invention will be explained. The studs 22 and 24 are purposely kept small, and the contact plates are made as small as is consistent with the performance requirements of the switch. By this means, there is provided a minimum of mass and conducting media to draw heat from the thermal element 14. This is important where it is desired to construct a device in which the thermal element will be actuated by a low order of magnitude of current. This construction is made possible by the use of the two heaters 46 and 48, which in essence are the component parts of a single heater in the middle of which (electrically and constructionally) has been placed the thermal element 14. By the provision of this split heater and the small contact plates and studs, and by providing a construction in which the terminals 30 and 32 are not physically connected to the contact plates 26 and 28, it is conveniently and economically possible to manufacture a device of this kind which will respond to a low number of amperes.

With the parts thus described, there is nothing to prevent disc 14 from rotating on adjustable post 8 and thus misaligning the respective contacts and terminal plates, nor to prevent the reset plate 12 from rotating on the adjusting post and thus having the bosses 20 become misaligned with regard to the snap-acting element 14, and nothing to prevent the heating elements 46 and 48 from slipping off the studs 44 and 42.

To maintain these parts in proper alignment, and to prevent the heating elements from slipping off their respective studs, there is shown in Fig. 5 an insert indicated generally by numeral 60, and preferably made of a molded synthetic resin or some other electrical insulating material which is also heat-resistant. Insert 60 comprises a roughly C-shaped member having the short leg 62, the long leg 64, and a connecting portion 66. The distance between leg 64 and 66 is such that the insert 60 fits smoothly but easily into the interior of base 2 as shown in Fig. 1, with the back 66 overlying heater 48, the end of short leg 62 overlying the stud 42 and a portion of the heater 48 as it bends around stud 42, and the end of long leg 64 overlying stud 44 and a portion of heater 46 as it bends around stud 44. By these means the respective heaters are kept from slipping over the ends of their respective studs. The corner of insert 60 is cut away as shown at 68, and it will be observed that one ear 18 of disc 14 fits into this cut-away corner 68. Thus, with the insert in position as shown in Fig. 1, the disc is kept aligned properly. On the inside of member 60 there is provided a rabbet 70 (indicated in dotted lines in Fig. 5). This relief is provided so that one corner of the reset plate 12 can fit into the corner of the insert 60 defined by the short leg 62 and the back 66. This is shown in dotted lines in Fig. 1. By this means, the reset plate is prevented from rotating on the adjusting post 8, and thus the reset plate is maintained in proper alignment with snap-acting element 14. Instead of having the rabbet 70, the base 2 may be made wider than shown, and leg 62 longer, so that the end of reset plate 14 will be held from moving by having its corners strike or slide against the inside of short leg 62 and back to 66. However, in order to make this particular embodiment as compact as possible, the rabbet 70 is provided.

In the completed structure a cover plate is provided over the open top of base 2, this cover plate not being shown, but serving to hold the insert in place in the base. It should be pointed out that the depth of the relief 68 is such as to allow snap-acting element 14 to snap when heated to the proper temperature.

Thus a simple means is provided for maintaining the parts of the switch in their correct alignment, as well as restraining the heating elements in their proper places.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A thermostatic switch comprising a base; a thermostatic element mounted on the base and carrying at least one movable contact; at least one stationary contact mounted on the base and positioned to be engaged by said movable contact; at least one heating element mounted on said base and adapted to heat said element upon the passage of electrical current therethrough; and a removable guide member of electrical insulating material positioned on said base and adapted simultaneously to orient said thermostatic element and to hold said heating element against said base.

2. A thermostatic switch comprising a base having an upstanding skirt thereon to form a cup-like member; a thermostatic element mounted on the base inside the member and carrying at least one movable contact; at least one stationary contact mounted on the base inside the member and positioned to be engaged by said movable contact; at least one heating element lying in said member and adapted to heat said element upon the passage of electrical current therethrough; and an insertable guide member of electrical insulating material positioned in said member and adapted to hold said heating element against said base, said guide member comprising an upstanding wall of electrical insulating material standing adjacent to at least a portion of the inside wall of said skirt.

3. A thermostatic switch comprising a base having an upstanding skirt thereon to form a cup-like member; a thermostatic element mounted on the base inside the member and carrying at least one movable contact; at least one stationary contact mounted on the base inside the member and positioned to be engaged by said movable contact; at least one heating element lying in said member and adapted to heat said element upon the passage of electrical current therethrough; and an insertable guide member of electrical insulating material positioned in said member and adapted simultaneously to orient said thermostatic element and to hold said heating element against said base.

4. The thermostatic switch of claim 3 in which said guide member comprises an upstanding wall of electrical insulating material standing adjacent to at least a portion of the inside wall of said skirt.

5. The thermostatic switch of claim 3 in which said guide member comprises an upstanding wall of electrical insulating material standing adjacent to at least a portion of the inside wall of said skirt and having at least one opening therein adapted to receive, for guiding purposes, a portion of said thermostatic element.

6. A thermostatic switch comprising a base having an upstanding skirt thereon to form a cup-like member; a thermostatic element mounted on the base inside the member and carrying a pair of movable contacts; a pair of stationary contacts mounted on the base and positioned to be engaged by said movable contacts; a pair of terminals mounted on said base; a pair of heating elements each of which extends between a stationary contact and a terminal and is electrically connected thereto; and an insertable guide member of electrical insulating material positioned in said member and adapted simultaneously to orient said thermostatic element and to hold said heating elements against said base.

7. The thermostatic switch of claim 6 having also a manually resettable member mounted on said base; and in which said guide member comprises an upstanding wall of electrical insulating material standing adjacent to at least a portion of the interior wall of said skirt, said guide member simultaneously orienting said thermostatic member and said resettable member and holding said heaters against the base.

8. A thermostatic switch comprising a base having an upstanding skirt thereon to form a cup-like member; a snap-acting thermostatic element centrally mounted by means of a mounting post on said base and carrying a pair of movable contacts; a manual resetting plate also mounted on said mounting post and slidable toward and away from said element; a pair of stationary contacts mounted on said base and positioned to be engaged by said movable contacts; a pair of terminals mounted on said base; a pair of projecting studs of electrical insulating material provided on said base; a pair of heating elements each of which extends from a terminal around one of said studs and to a stationary contact; and an insertable guide member comprising an upstanding wall of electrical insulating material positioned to orient said snap-acting element and said resetting plate with respect to each other and with respect to said stationary contacts, the bottom of said wall resting on the tops of said studs thereby holding said heating elements onto the studs.

References Cited in the file of this patent

UNITED STATES PATENTS

| Number | Name | Date |
|---|---|---|
| 2,411,352 | Armstrong | Nov. 19, 1946 |
| 2,414,531 | Johns | Jan. 21, 1947 |
| 2,439,338 | Fuge et al. | Apr. 6, 1948 |
| 2,488,049 | Bolesky | Nov. 15, 1949 |
| 2,573,404 | Clark | Oct. 30, 1951 |